(No Model.) 3 Sheets—Sheet 1.

E. ERCKSON.
ROTARY HARROW.

No. 505,038. Patented Sept. 12, 1893.

(No Model.)

E. ERCKSON.
ROTARY HARROW.

No. 505,038.  Patented Sept. 12, 1893.

3 Sheets—Sheet 2.

Witnesses,
C. E. Hunt.
J. W. Foster.

Inventor,
Edward Erckson
by J. R. Littell,
his Attorney

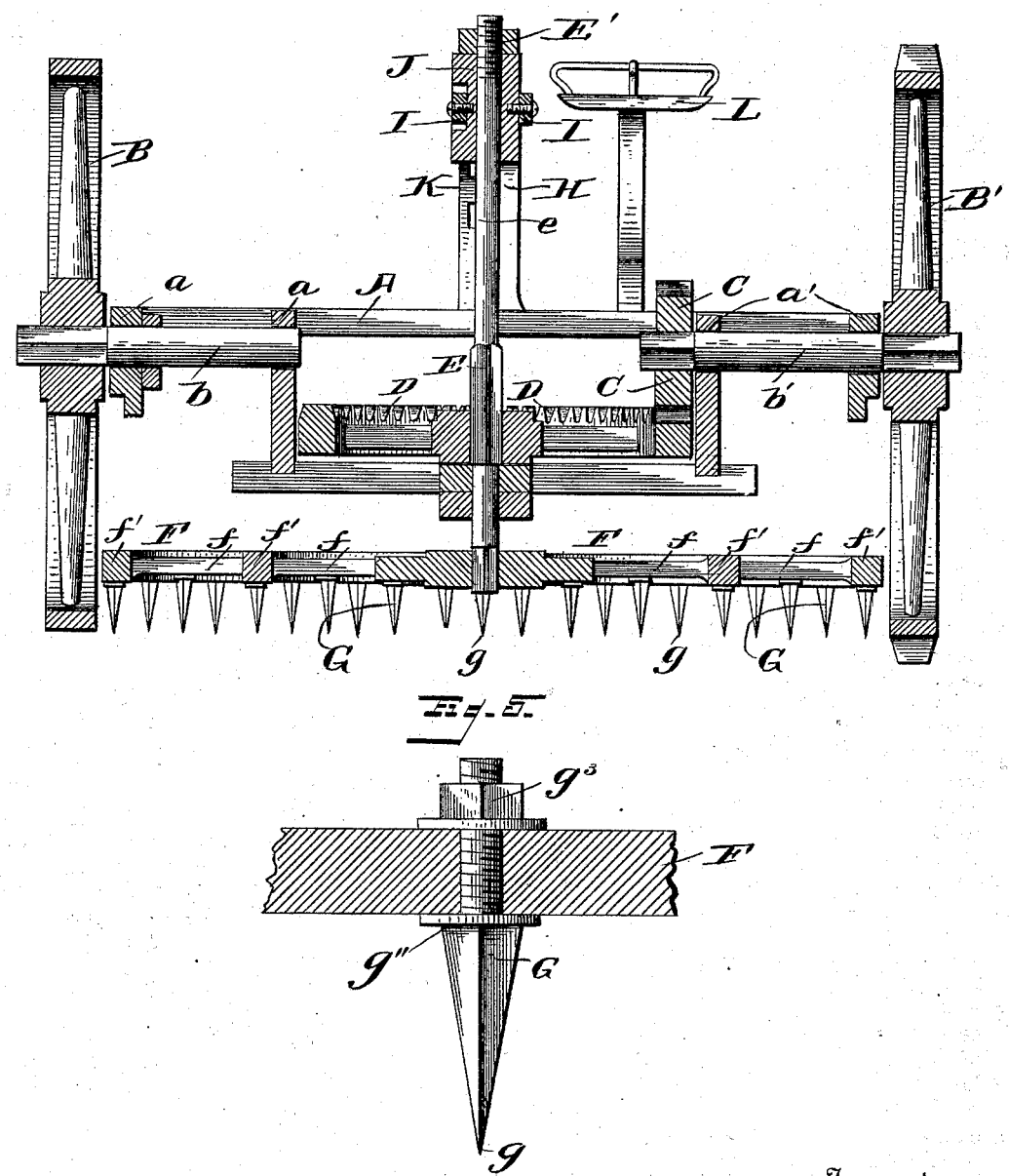

UNITED STATES PATENT OFFICE.

EDWARD ERCKSON, OF OURAY, COLORADO, ASSIGNOR OF ONE-HALF TO GEORGE C. PIERCE AND JOHN P. OLSON, OF SAME PLACE.

ROTARY HARROW.

SPECIFICATION forming part of Letters Patent No. 505,038, dated September 12, 1893.

Application filed November 2, 1892. Serial No. 450,723. (No model.)

*To all whom it may concern:*

Be it known that I, EDWARD ERCKSON, a citizen of the United States, residing at Ouray, in the county of Ouray and State of Colorado, have invented a new and useful Rotary Harrow, of which the following is a specification.

My invention relates to a new and useful improvement in harrows, of that class commonly known as rotary, and consists, generally stated, in the peculiar construction of the webbed harrow disk, and the means for revolving the same, whereby an advance and revolving motion is communicated thereto.

Another feature of the invention resides in the peculiar arrangement of the harrow teeth on the webbed disk (that of concentric and radial series of teeth) which, taken together with the co-relative advance and revoluble motion of the disk enables the teeth to come in contact with and disintegrate all the clods within the area of the wheel and its path.

Other minor details of invention lie in the construction and the arrangement of the means for throwing the disk into and out of engagement with the ground, and in the means for communicating a revoluble motion to the disk, all as will hereinafter be described and afterward pointed out in the claims.

Figure 1:
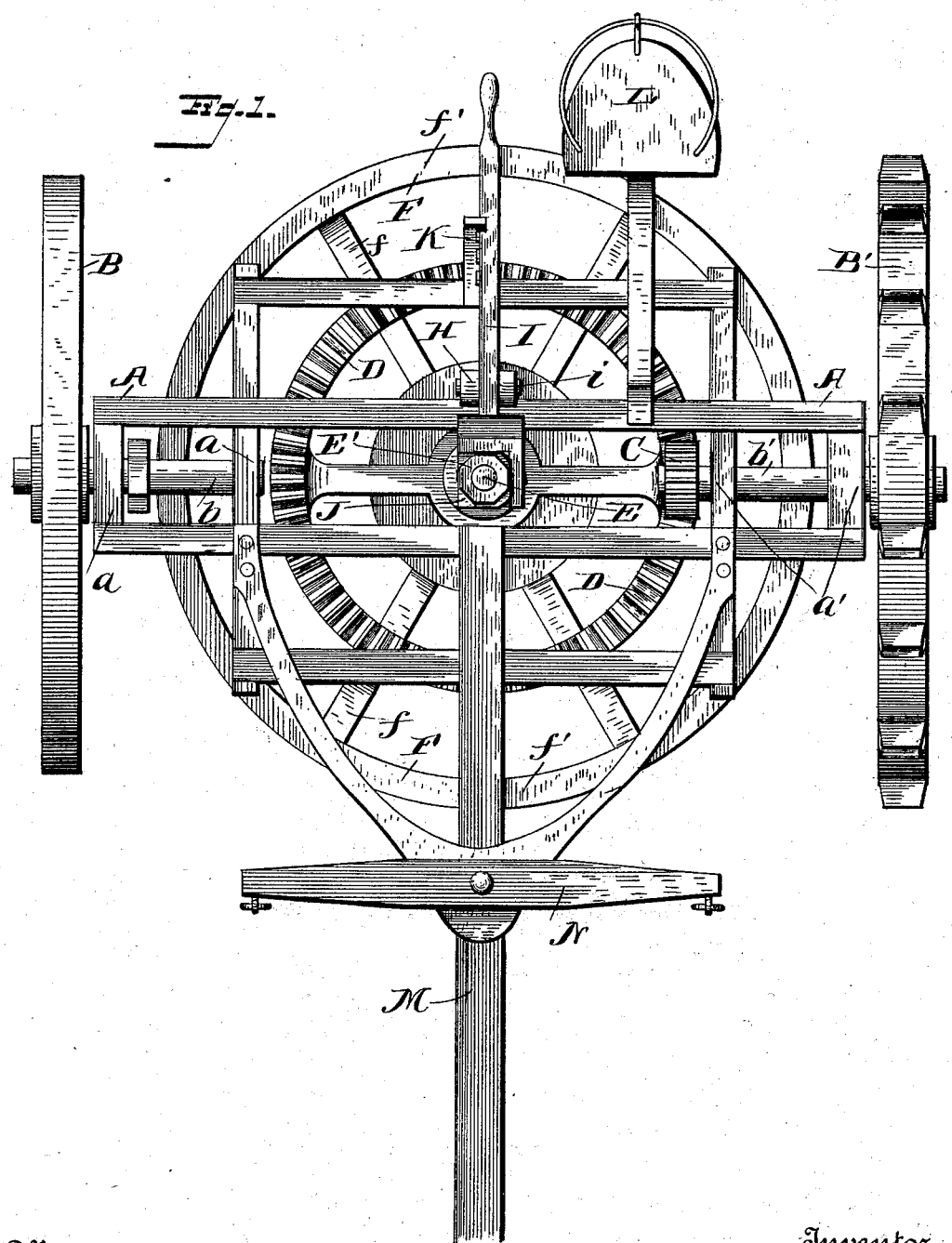
Figure 2:
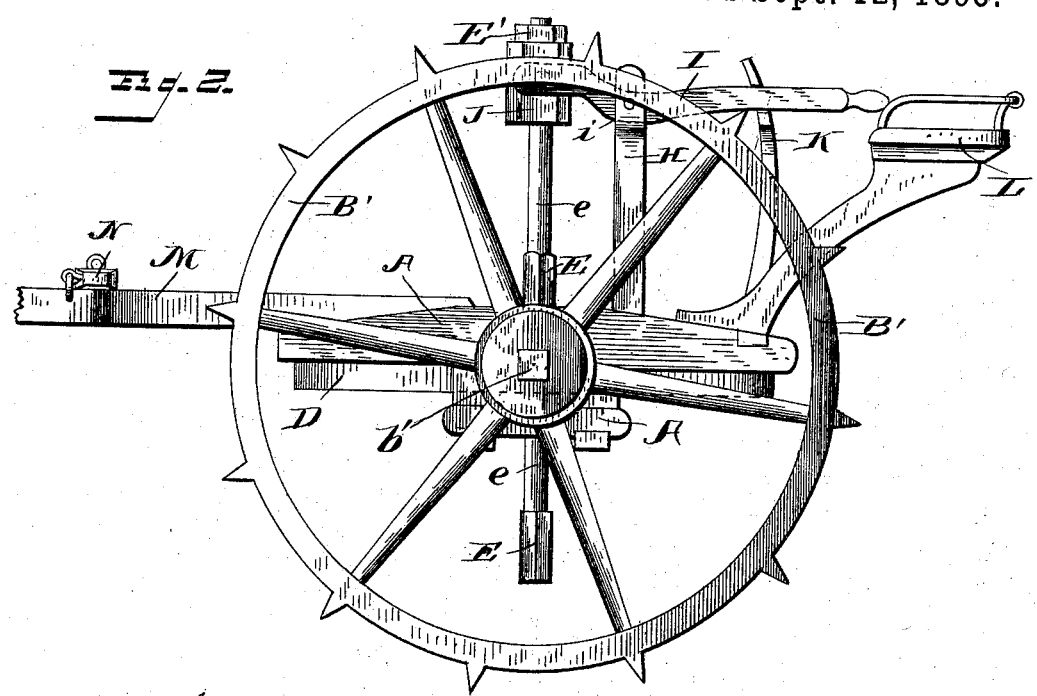
Figure 4:
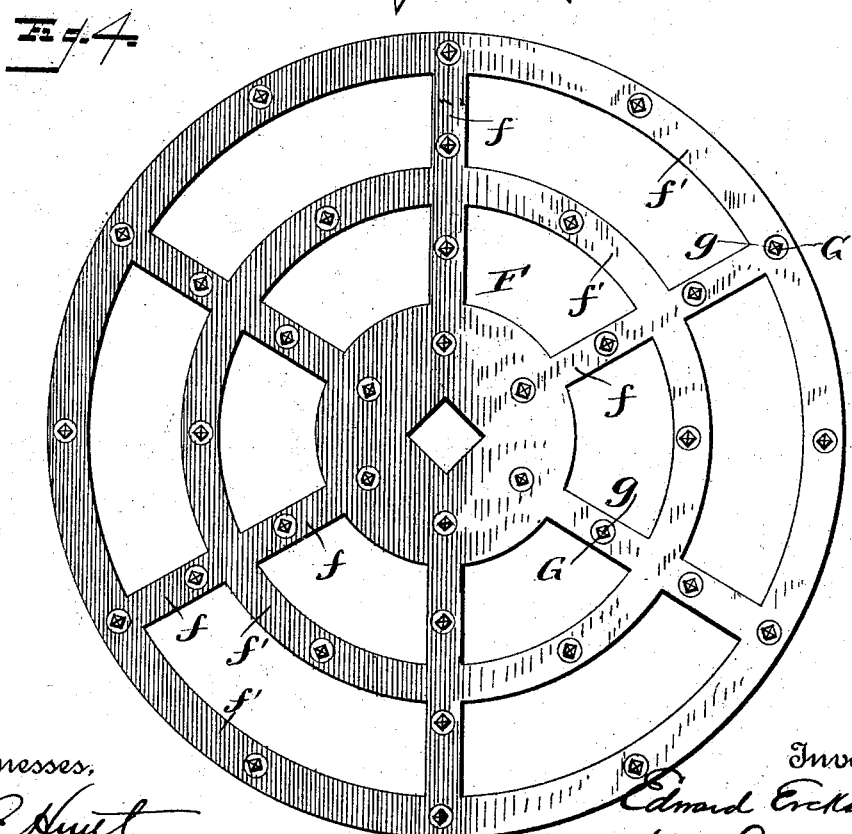

Referring to the drawings wherein like symbols of reference refer to like parts wherever they occur: Figure 1 is a top plan view. Fig. 2 is a side elevation with the ground wheel removed. Fig. 3 is a longitudinal vertical section taken through the center on line $x—x$ of Fig. 1. Fig. 4 is an inverted plan of the harrow disk, showing the arrangement of teeth thereon. Fig. 5 is an enlarged detached sectional view of one of the harrow teeth, illustrating the mode of connection with the webbed disk.

In the drawings, A represents the frame which may be of any suitable construction, but preferably formed of cast iron for lightness and strength.

Journaled in boxes or bearings $a$ and $a'$ on the under side of the frame, are stud shafts $b$ and $b'$ upon the outer ends of which are secured the ground wheels B and B', the latter being rigidly secured to its stud shaft and provided on its periphery with spurs or teeth adapted to enter into the ground and form a positive connection therewith.

Mounted on the inner end of the stud shaft $b'$ is a crown pinion C which engages and transmits motion to, a crown master wheel D, said master wheel being provided with a square opening in its center, through which passes a vertical shaft E, angular in cross-section, and adapted to slide within the angular opening of the master wheel.

Rigidly secured to the lower end of this vertical shaft E, is the harrow disk F, formed with radiating arms $f$ and concentrically arranged rings $f'$ said arms and rings being formed of iron, and either made integral or separate; in the latter instance, however, suitable means will be provided to secure the parts together.

G indicates the teeth, preferably formed with an angular lower portion tapering toward its end to form the entering point $g$, while its upper end is reduced and rounded so as to form a shoulder $g''$ adapted to abut against the lower side of the disk when the tooth is in place. I preferably thread the rounded portion of the tooth for the reception of a nut $g^3$ as shown in Fig. 5, thus permitting an easy removal should it be desired at any time to take the old teeth out for the purposes of sharpening or substituting new ones. In the insertion of teeth in a disk of this description, it is desirable that they should be so placed as to come in contact with the greatest available space permissible by the diameter, and in a construction such as shown where radiating and concentric rings are used to form the disk, I arrange said teeth in like series, that is, radially and concentrically disposed, which I find is most advantageous in harrows of this description, as the revoluble motion is only communicated to the disk when the same is advancing, and no two teeth move in the same circle or describe the same line as another given tooth.

H indicates a standard secured to the frame A, preferably in the rear of the vertical shaft E, said standard being bifurcated at its upper end to afford reception of a lever I which is pivoted therein at $i$. This lever is bifurcated at its forward end to receive a sliding collar J loosely mounted on the shaft E, which is rounded at *e* to permit its free rotation in the collar.

E' is a cap or knob on the top of the shaft E, the function of which being to carry the vertical shaft E and the harrow disk G upward when the collar J comes in contact therewith after the depression of the rear end of the lever I.

K indicates a notched segment located in juxtaposition to the free end of the lever I, and through the medium of which with its contained notches, the disk is made adjustable to accommodate different soils by the adjustability of the depth of the teeth relative thereto.

L indicates the driver's seat arranged at the rear of the frame A so as to throw the weight at the rear of the disk which is elevated at its front end through this arrangement, thus permitting the teeth coming in contact with large clods to strike them gradually at first until the machine is well advanced, at which time the clod being acted upon the teeth of greater depth will be entirely disintegrated.

M indicates the tongue, and N the double tree carrying the singletrees, such parts being of any ordinary or approved construction, and secured to the device in any suitable manner.

The operation may be described as follows: The device being started by means of any suitable power hitched thereto, the wheel B' carrying the pinion C on its stud shaft, will positively revolve said pinion by reason of its peripheral biting spurs, and said pinion in turn will transmit motion to the master wheel D, which as before stated, is provided with an angular opening for the passage of the vertical shaft E which carries the harrow disk F at its lower end. By reason of the sliding connection of the shaft with the master wheel, when the lever I is depressed at its free end to elevate the collar so as to engage the cap E', the collar carries with it the shaft and harrow disk, thus elevating the latter out of its contact with the ground. The disk is held in its elevated position by the engagement of the lever I with one of the notches on the segment K, and when it is desired to place the disk in an operative position, it is only necessary to release the lever from its engagement with the notched segment when it will drop of its own gravity into an operative position.

Having thus described my invention, what I claim, and desire to secure by Letters Patent of the United States, is—

1. In a rotary harrow, the combination, with a webbed disk composed of concentric rings supported by radial spokes, of a series of harrow teeth carried by said disk, each tooth consisting of a spear point, a shank, two annular collars or washers at the extremities of the shank, and a binding nut and means for rotating and adjusting said disk, substantially as set forth.

2. In a rotary harrow, the combination, with the two drive-wheels, a stud-shaft for each drive-wheel journaled in a swinging frame, and a swinging frame mounted on and supported by said stud-shafts, of a pinion keyed to the inner end of one stud-shaft, a horizontal crown gear intermeshing with said pinion and mounted upon a vertically-movable shaft, a vertically-slidable upright shaft loosely rotatably connected to said crown-gear, means for moving and controlling said shaft, and a webbed disk composed of concentric rings and provided with teeth mounted on the lower end of the upright shaft, each tooth comprising a spear-point, a shank, annular collars at the end of the shank, and a binding nut substantially as set forth.

In testimony whereof I affix my signature in presence of two witnesses.

EDWARD ERCKSON.

Witnesses:
GEO. H. MATHEWS,
W. A. BEGOLE.